(12) United States Patent
Felix

(10) Patent No.: US 9,707,545 B2
(45) Date of Patent: Jul. 18, 2017

(54) THREE-WAY CATALYST

(71) Applicant: Johnson Matthey Public Limited Company, London (GB)

(72) Inventor: Noelia Montserrat Cortes Felix, Reading (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/016,395

(22) Filed: Feb. 5, 2016

(65) Prior Publication Data

US 2016/0228856 A1 Aug. 11, 2016

Related U.S. Application Data

(60) Provisional application No. 62/112,275, filed on Feb. 5, 2015.

(51) Int. Cl.
| | |
|---|---|
| *B01D 53/56* | (2006.01) |
| *B01D 53/94* | (2006.01) |
| *B01J 8/02* | (2006.01) |
| *B01J 21/00* | (2006.01) |
| *B01J 21/04* | (2006.01) |
| *B01J 23/00* | (2006.01) |
| *B01J 23/02* | (2006.01) |
| *B01J 23/08* | (2006.01) |

(Continued)

(52) U.S. Cl.
CPC ........ *B01J 23/8946* (2013.01); *B01D 53/945* (2013.01); *B01D 53/9445* (2013.01); *B01J 21/04* (2013.01); *B01J 23/005* (2013.01); *B01J 23/44* (2013.01); *B01J 23/464* (2013.01); *B01J 37/024* (2013.01); *B01J 37/0205* (2013.01); *B01J 37/08* (2013.01); *F01N 3/101* (2013.01); *B01D 2255/1023* (2013.01); *B01D 2255/1025* (2013.01); *B01D 2255/2042* (2013.01); *B01D 2255/20746* (2013.01); *B01D 2255/405* (2013.01); *B01J 35/0006* (2013.01); *B01J 35/04* (2013.01); *B01J 37/0244* (2013.01); *B01J 2523/00* (2013.01); *Y02T 10/22* (2013.01)

(58) Field of Classification Search
CPC . B01J 21/005; B01J 21/04; B01J 21/06; B01J 21/063; B01J 21/066; B01J 21/08; B01J 23/005; B01J 23/10; B01J 23/44; B01J 23/464; B01J 23/58; B01J 23/63; B01J 23/64; B01D 53/945
USPC ....... 502/262, 304, 327, 328, 333, 339, 349, 502/350, 355, 439, 527.12, 527.13, 524; 423/213.5
See application file for complete search history.

(56) References Cited

U.S. PATENT DOCUMENTS

| | | | |
|---|---|---|---|
| 4,788,174 A | 11/1988 | Arai | |
| 5,013,705 A * | 5/1991 | Koberstein | .......... B01D 53/945 423/213.5 |

(Continued)

FOREIGN PATENT DOCUMENTS

WO 9205861 4/1992

*Primary Examiner* — Cam N. Nguyen

(57) ABSTRACT

A three-way catalyst composition, and its use in an exhaust system for internal combustion engines, is disclosed. The three-way catalyst composition comprises rhodium, a cerium-containing oxide, and a supported palladium component. The supported palladium component comprises palladium, barium, and cobalt and alumina. The three-way catalyst composition shows improved light-off performance.

14 Claims, 3 Drawing Sheets

NOₓ light-off of redox aged samples at continuous lambda 0.95

(51) Int. Cl.

| | |
|---|---|
| *B01J 23/10* | (2006.01) |
| *B01J 23/40* | (2006.01) |
| *B01J 23/42* | (2006.01) |
| *B01J 23/44* | (2006.01) |
| *B01J 23/58* | (2006.01) |
| *B01J 23/89* | (2006.01) |
| *F01N 3/10* | (2006.01) |
| *B01J 37/08* | (2006.01) |
| *B01J 37/02* | (2006.01) |
| *B01J 23/46* | (2006.01) |
| *B01J 35/04* | (2006.01) |
| *B01J 35/00* | (2006.01) |

(56) References Cited

U.S. PATENT DOCUMENTS

| | | | | |
|---|---|---|---|---|
| 5,116,800 | A * | 5/1992 | Williamson | B01D 53/945 423/213.5 |
| 5,407,880 | A * | 4/1995 | Ikeda | B01D 53/944 423/239.2 |
| 5,894,068 | A * | 4/1999 | Kharas | B01D 53/9418 422/169 |
| 6,069,111 | A | 5/2000 | Yamamoto et al. | |
| 6,087,295 | A * | 7/2000 | Kharas | B01D 53/9418 423/213.5 |
| 6,261,989 | B1 * | 7/2001 | Tanaka | B01D 53/945 29/890 |
| 6,294,140 | B1 * | 9/2001 | Mussmann | B01D 53/945 423/213.5 |
| 6,348,430 | B1 * | 2/2002 | Lindner | B01D 53/945 502/304 |
| 6,413,483 | B1 * | 7/2002 | Brisley | B01D 53/9422 423/213.2 |
| 7,022,646 | B2 * | 4/2006 | Li | B01D 53/9422 502/339 |
| 7,276,212 | B2 * | 10/2007 | Hu | B01D 53/9454 422/168 |
| 7,396,516 | B2 * | 7/2008 | Fisher | B01D 53/945 123/1 R |
| 7,517,510 | B2 * | 4/2009 | Chen | B01D 53/945 422/168 |
| 7,550,124 | B2 * | 6/2009 | Chen | B01D 53/945 422/168 |
| 7,758,834 | B2 * | 7/2010 | Chen | B01D 53/945 423/213.2 |
| 7,795,172 | B2 * | 9/2010 | Foong | B01D 53/945 502/302 |
| 7,875,250 | B2 * | 1/2011 | Nunan | B01D 53/945 422/168 |
| 8,007,750 | B2 * | 8/2011 | Chen | B01D 53/945 423/239.1 |
| 8,038,951 | B2 * | 10/2011 | Wassermann | B01J 21/066 422/168 |
| 8,066,963 | B2 * | 11/2011 | Klingmann | B01D 53/944 423/212 |
| 8,207,078 | B2 * | 6/2012 | Lu | B01D 53/945 502/302 |
| 8,227,374 | B2 * | 7/2012 | Sato | B01D 53/945 502/100 |
| 8,394,348 | B1 * | 3/2013 | Nunan | B01D 53/945 423/213.2 |
| 8,546,296 | B2 * | 10/2013 | Yabuzaki | B01D 53/945 423/213.5 |
| 8,617,496 | B2 * | 12/2013 | Wei | B01J 23/63 423/213.2 |
| 8,640,440 | B2 * | 2/2014 | Klingmann | B01D 53/944 422/170 |
| 8,828,343 | B2 * | 9/2014 | Liu | B01D 53/945 423/213.5 |
| 8,833,064 | B2 * | 9/2014 | Galligan | B01D 53/945 423/213.5 |
| 8,906,330 | B2 * | 12/2014 | Hilgendorff | B01J 23/464 423/213.5 |
| 8,950,174 | B2 * | 2/2015 | Hilgendorff | B01D 53/945 423/213.2 |
| 9,012,350 | B2 * | 4/2015 | Aoki | B01D 53/865 502/304 |
| 2002/0057997 | A1 * | 5/2002 | Mizuno | B01D 53/945 422/171 |
| 2008/0072578 | A1 * | 3/2008 | Kumar | B01D 53/945 60/299 |
| 2008/0318769 | A1 | 12/2008 | Wakamatsu et al. | |
| 2009/0280978 | A1 * | 11/2009 | Nakamura | B01D 53/945 502/303 |
| 2010/0104491 | A1 | 4/2010 | Deeba et al. | |
| 2011/0126527 | A1 * | 6/2011 | Hilgendorff | B01D 53/9422 60/299 |
| 2011/0217216 | A1 * | 9/2011 | Liu | B01D 53/945 423/213.5 |
| 2012/0055141 | A1 * | 3/2012 | Hilgendorff | B01J 23/58 60/301 |
| 2012/0128558 | A1 * | 5/2012 | Nunan | B01D 53/945 423/213.5 |
| 2013/0236380 | A1 * | 9/2013 | Golden | F01N 3/101 423/213.2 |
| 2013/0287658 | A1 | 10/2013 | McKenna | |
| 2014/0228209 | A1 * | 8/2014 | Aoki | B01D 53/865 502/304 |
| 2015/0352532 | A1 * | 12/2015 | Hatfield | B01D 53/945 502/242 |

* cited by examiner

NOx light-off of redox aged samples at continuous lambda 0.95

HC light-off of redox aged samples at continuous lambda 0.95

CO light-off of redox aged samples at continuous lambda 0.95

THREE-WAY CATALYST

FIELD OF THE INVENTION

The invention relates to a three-way catalyst composition, its use in exhaust systems for internal combustion engines, and a method for treating an exhaust gas from an internal combustion engine.

BACKGROUND OF THE INVENTION

Internal combustion engines produce exhaust gases containing a variety of pollutants, including hydrocarbons (HCs), carbon monoxide (CO), and nitrogen oxides ("$NO_x$"). Emission control systems, including exhaust gas catalysts, are widely utilized to reduce the amount of these pollutants emitted to atmosphere. A commonly used catalyst for gasoline engine applications is the "three-way catalyst" (TWC). TWCs perform three main functions: (1) oxidation of carbon monoxide (CO); (2) oxidation of unburnt hydrocarbons; and (3) reduction of $NO_x$ to $N_2$.

TWCs, like other exhaust gas catalysts, typically achieve very high efficiencies once they reach their light-off temperature. TWCs that have a low light-off temperature allow the catalyst to work sooner by decreasing the time it takes for the exhaust system to reach the temperature required for operation. Because exhaust gas is untreated before reaching light-off, this period can lead to increased emissions. As even more stringent national and regional legislation lowers the amount of pollutants that can be emitted from diesel or gasoline engines, reducing emissions during the period of time before light-off is becoming a major challenge. Thus, methods and new catalysts for reducing the level of $NO_x$ and hydrocarbons emitted during cold start condition continue to be explored.

As with any automotive system and process, it is desirable to attain still further improvements in exhaust gas treatment systems, particularly under low temperature conditions. We have discovered a new three-way catalyst that provides enhanced cleaning of the exhaust gases from internal combustion engines.

SUMMARY OF THE INVENTION

The invention is a three-way catalyst composition that comprises rhodium, a cerium-containing oxide, and a supported palladium component. The supported palladium component comprises palladium, barium, cobalt and alumina. The invention also includes a three-way catalyst component comprising the three-way catalyst composition supported on a substrate, and its use in an exhaust system. The three-way catalyst composition shows improved light-off performance.

DETAILED DESCRIPTION OF THE INVENTION

Figure 1:
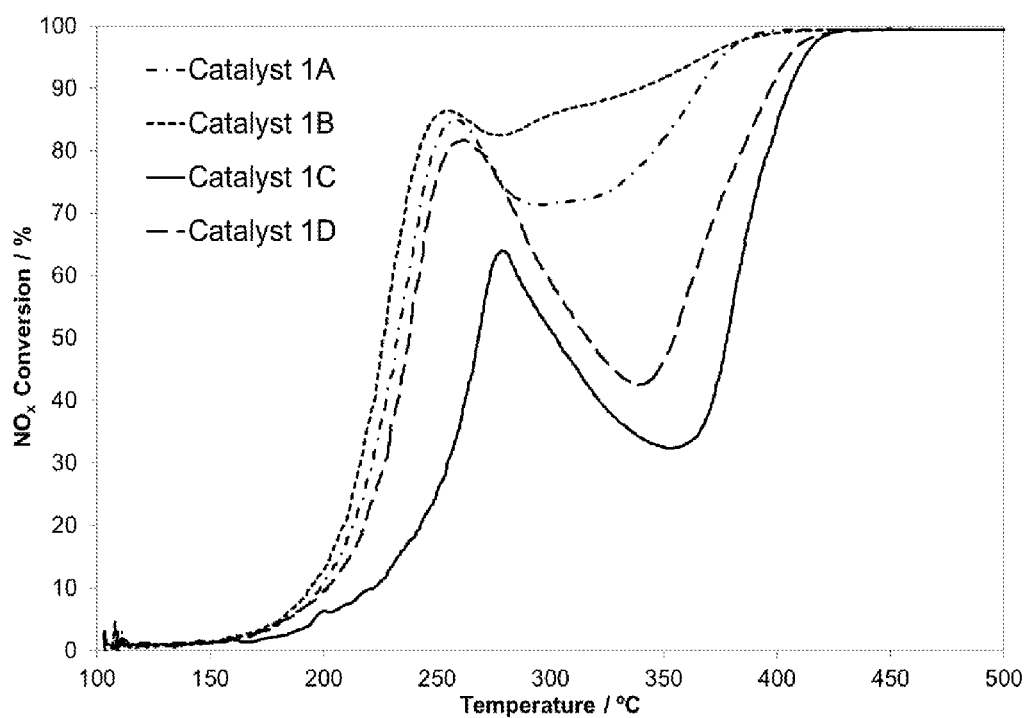
FIG. 1 shows $NO_x$ light-off results of redox aged samples at continuous lambda 0.95 for catalysts of the invention and comparative catalysts.
Figure 2:
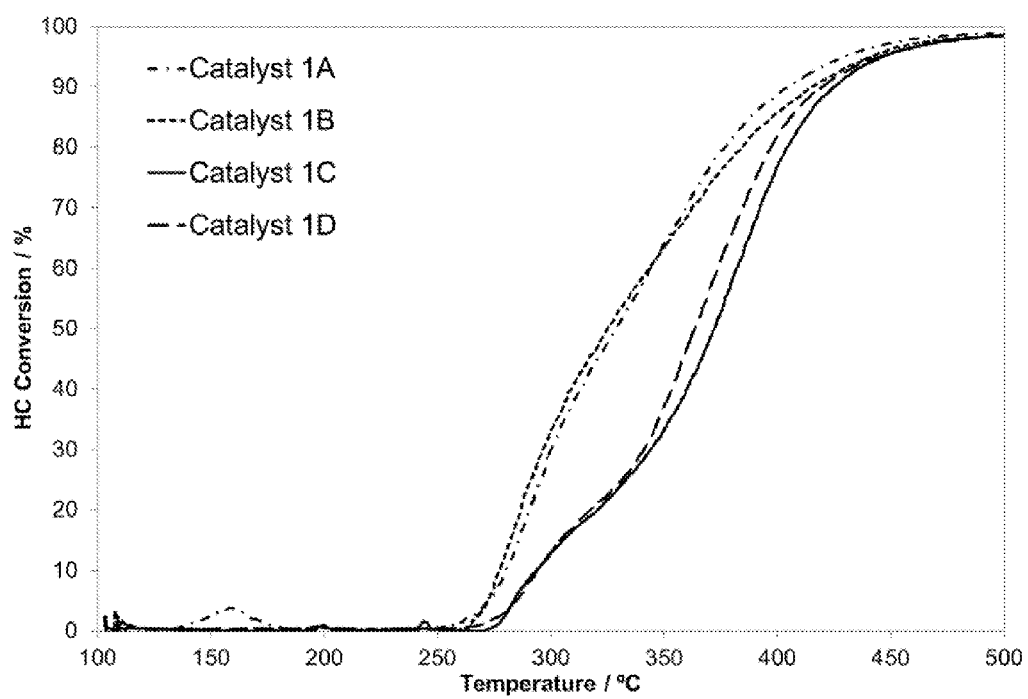
FIG. 2 shows hydrocarbon (HC) light-off results of redox aged samples at continuous lambda 0.95 for catalysts of the invention and comparative catalysts.
Figure 3:
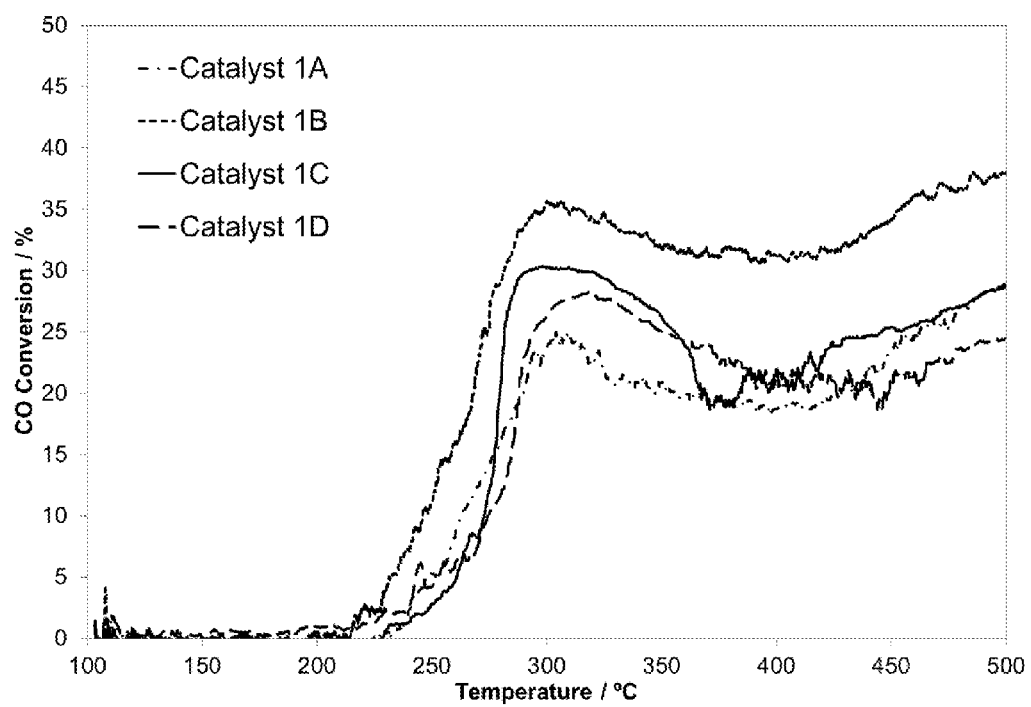
FIG. 3 shows CO light-off results of redox aged samples at continuous lambda 0.95 for catalysts of the invention and comparative catalysts.

The three-way catalyst composition of the invention comprises rhodium, a cerium-containing oxide, and a supported palladium component. The supported palladium component comprises palladium, barium, cobalt, and alumina.

The supported palladium component comprises an alumina. Useful aluminas preferably have surface areas in the range 10 to 1500 $m^2/g$, pore volumes in the range 0.1 to 4 mL/g, and pore diameters from about 10 to 1000 Angstroms. High surface area aluminas having a surface area greater than 80 $m^2/g$ are particularly preferred. Preferably, the alumina is a rare earth or alkaline earth-stabilized aluminum oxide. Preferably, the rare earth or alkaline earth-stabilized aluminum oxide contains a rare earth or alkaline earth comprising lanthanum, neodymium, praseodymium, yttrium, barium, magnesium, and strontium. Preferably, the rare earth, alkaline earth, or transition metal-stabilized aluminum oxide comprises from 0.1 to 20 weight percent (more preferably from 0.5 to 5 weight percent) rare earth or alkaline earth or transition metal.

The supported palladium component of the present invention also comprises palladium, barium and cobalt. The supported palladium component may be prepared by any suitable means. Preferably, the palladium, cobalt and barium are loaded onto the alumina by any known means to form the supported palladium component. For example, a palladium compound (such as palladium nitrate), a cobalt compound (such as cobalt nitrate), and a barium compound (such as barium nitrate) may be supported on the alumina support by impregnation, adsorption, ion-exchange, incipient wetness, precipitation, spray drying, or the like.

The order of addition of the palladium, cobalt and barium compounds to the alumina may be in a number of different orders. For example, the palladium, cobalt, and barium compounds may be added to the alumina simultaneously, or may be added sequentially in any order (e.g., Co, then Ba, then Pd, etc.). Preferably, the cobalt compound is added to the alumina support prior to the addition of the palladium and barium compound.

In a preferred embodiment, the cobalt and alumina of the supported palladium component are in the form of a cobalt aluminate spinel prior to addition of palladium and barium. The cobalt aluminate spinel preferably has an atomic ratio of Co to Al ranging from about 0.17 to about 1, more preferably from about 0.25 to about 0.75, and most preferably from about 0.35 to about 0.65. A most preferred cobalt aluminate spinel includes $CoAl_2O_4$.

Cobalt aluminate may be formed by impregnating a cobalt compound on alumina to form a cobalt-alumina species, and then calcining at high temperatures. Preferably, the impregnated cobalt-alumina species is calcined at a temperature greater than 800° C., more preferably greater than 900° C., to form the cobalt aluminate spinel. The calcination is typically performed in the presence of an oxygen-containing gas (such as air) for greater than 1 hour. The high-temperature calcination leads to the formation of spinel.

If cobalt aluminate spinel is not formed, and just impregnated cobalt-alumina is used, the light-off performance is still improved although not as improved compared to the cobalt aluminate spinel.

The supported palladium component preferably comprises 0.1 to 10 weight percent palladium, more preferably 0.5 to 5 weight percent palladium, and most preferably 1 to 3 weight percent palladium. The supported palladium component preferably comprises 0.5 to 10 weight percent cobalt, more preferably 2 to 15 weight percent cobalt, and most preferably 3 to 12 weight percent cobalt. The supported palladium component preferably comprises 1 to 10 weight percent barium, more preferably 2 to 8 weight percent barium, and most preferably 3 to 7 weight percent barium.

Preferably, the weight ratio of cobalt:barium is greater than 1, more preferably 2 or higher.

In addition to the supported palladium component, the three-way catalyst composition of the invention comprises rhodium and a cerium-containing material. The ceria-containing material is preferably ceria, ceria-zirconia, ceria-zirconia-alumina, or mixtures thereof. More preferably, the ceria-containing material is ceria-zirconia.

Preferably, the rhodium is supported on an inorganic oxide carrier. The inorganic oxide carrier preferably includes oxides of Groups 2, 3, 4, 5, 13 and 14 elements. Most preferably, the support is an alumina, silica, titania, zirconia, magnesia, niobia, tantalum oxide, molybdenum oxide, tungsten oxide, a mixed oxide or composite oxide of any two or more thereof (e.g. silica-alumina, magnesia-alumina, etc.), and mixtures thereof. Useful inorganic oxides preferably have surface areas in the range 10 to 1500 $m^2/g$, pore volumes in the range 0.1 to 4 mL/g, and pore diameters from about 10 to 1000 Angstroms. High surface area supports having a surface area greater than 80 $m^2/g$ are particularly preferred. In one embodiment, the rhodium is supported on the cerium-containing material.

The rhodium may be loaded onto the inorganic oxide carrier by any known means, the manner of addition is not considered to be particularly critical. For example, a rhodium compound (such as rhodium nitrate) may be added to an alumina by impregnation, adsorption, ion-exchange, incipient wetness, precipitation, spray drying, or the like. Preferably, if the rhodium is deposited on the support, the supported rhodium contains at least 0.04 weight percent rhodium.

The invention also includes a three-way catalyst component that comprises the three-way catalyst composition supported on a ceramic substrate or a metallic substrate. The ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

The metallic substrate may be made of any suitable metal, and in particular heat-resistant metals and metal alloys such as titanium and stainless steel as well as ferritic alloys containing iron, nickel, chromium, and/or aluminum in addition to other trace metals.

The substrate is preferably a flow-through substrate or a filter substrate. Most preferably, the substrate is a flow-through substrate. In particular, the flow-through substrate is a flow-through monolith preferably having a honeycomb structure with many small, parallel thin-walled channels running axially through the substrate and extending throughout the substrate. The channel cross-section of the substrate may be any shape, but is preferably square, sinusoidal, triangular, rectangular, hexagonal, trapezoidal, circular, or oval.

Preferably, the three-way catalyst component is prepared by depositing the three-way catalyst composition on the substrate using washcoat procedures. A representative process for preparing the three-way catalyst component using a washcoat procedure is set forth below. It will be understood that the process below can be varied according to different embodiments of the invention.

The washcoating is preferably performed by first slurrying finely divided particles of the three-way catalyst composition in an appropriate solvent, preferably water, to form a slurry. The slurry preferably contains between 5 to 70 weight percent solids, more preferably between 10 to 50 weight percent. Preferably, the particles are milled or subject to another comminution process in order to ensure that substantially all of the solid particles have a particle size of less than 20 microns in an average diameter, prior to forming the slurry. Additional components, such as stabilizers or promoters may also be incorporated in the slurry as a mixture of water soluble or water-dispersible compounds or complexes.

The substrate may then be coated one or more times with the slurry such that there will be deposited on the substrate the desired loading of the three-way catalyst composition.

Preferably, the three-way catalyst component comprises a substrate and at least one layer on the substrate. In one embodiment, the at least one layer comprises the three-way catalyst composition, such that the supported palladium component, the rhodium and the ceria-containing oxide are all within one layer. This can be produced by the washcoat procedure described above. One or more additional layers may be added to the one layer of three-way catalyst composition.

In another embodiment, two layers are disposed on the substrate. The first layer comprises the supported palladium component and the second layer comprises rhodium and the ceria-containing oxide. The first layer is disposed on the substrate and the second layer is deposited on the first layer.

The layer(s) are preferably deposited using washcoat procedures as described above. For example, the first layer is preferably prepared using a washcoat procedure. The supported palladium component is first coated onto the substrate by first slurrying finely divided particles of the supported palladium component in an appropriate solvent, preferably water, to form the slurry. The slurry preferably contains between 5 to 70 weight percent solids, more preferably between 10 to 50 weight percent. Preferably, the particles are milled or subject to another comminution process in order to ensure that substantially all of the solid particles have a particle size of less than 20 microns in an average diameter, prior to forming the slurry. Additional components, such as stabilizers or promoters may also be incorporated in the slurry as a mixture of water soluble or water-dispersible compounds or complexes.

The substrate may then be coated one or more times with the supported palladium slurry such that there will be deposited on the substrate the desired loading of catalytic materials in the first layer.

Preferably, the entire length of the substrate is coated with the first layer slurry so that a washcoat of the first layer covers the entire surface of the substrate.

After the first layer is deposited onto the substrate, the first layer is typically dried by heating at an elevated temperature of preferably 80 to 150° C. The substrate may also be calcined at higher temperatures (such as 400 to 600° C.) but calcination is typically not required before adding the second layer.

The second layer containing rhodium and a ceria-containing material is then added to the first layer in a similar manner as discussed above, and then dried by heating at an elevated temperature of preferably 80 to 150° C. The substrate may also be calcined at higher temperatures (such as 400 to 600° C.) but calcination is typically not required before the addition of the third layer. Preferably, the entire length of the substrate is coated with the second layer slurry so that a washcoat of the second layer covers the entire surface of the substrate.

It is also possible to form the supported palladium component on the substrate in order to produce the first layer of the three-way catalyst component. In such a procedure, a slurry of the alumina (or cobalt aluminate) is washcoated onto the substrate as described above. After the alumina (or cobalt aluminate) has been deposited on the substrate, and optionally calcined, the palladium, barium (and cobalt if needed) compounds may then be added to the alumina (or cobalt aluminate) washcoat. The palladium and barium (and cobalt if needed) may be added by any known means, including impregnation, adsorption, ion-exchange, or spray drying of a palladium compound, a barium compound and a cobalt compound. The palladium compound and the barium compound (and the cobalt compound, if needed) may be added simultaneously or sequentially in any order.

The invention also encompasses an exhaust system for internal combustion engines that comprises the three-way catalyst component of the invention. In the exhaust system, the three-way catalyst component may be placed in a close-coupled position or in the underfloor position.

The invention also encompasses treating an exhaust gas from an internal combustion engine, in particular for treating exhaust gas from a gasoline engine. The method comprises contacting the exhaust gas with the three-way catalyst component of the invention.

The following examples merely illustrate the invention. Those skilled in the art will recognize many variations that are within the spirit of the invention and scope of the claims.

Catalyst 1A (Pd—Ba—Co/Alumina Support):

Catalyst 1A is prepared by wet impregnation. Cobalt (II) nitrate hexahydrate (4.94 g) is dissolved in demineralized water (~15 mL). This Co-solution Is then added stepwise to alumina support (10 g), before being dried at 105° C. for 2-3 hours, followed by calcination at 650° C. for 2 hours to form a $Co/Al_2O_3$. Barium acetate (1.86 g) is then dissolved in demineralized water to give a final volume of 13 mL. The Ba-solution is added stepwise to the $Co/Al_2O_3$. The powder is sequentially dried at 105° C. for 2-3 hours and calcined at 650° C. for 2 hours to form a Ba—$Co/Al_2O_3$. Lastly, palladium nitrate solution (1.33 g of $Pd(NO_3)_2$, assay 15.03%) is diluted in 13 mL of demineralized water. The Pd-solution is added stepwise to the Ba—$Co/Al_2O_3$ followed by a drying process at 105° C. for 2-3 hours and calcination at 650° C. for 2 hours to form Catalyst 1A. Catalyst 1A contains 1 wt. % Pd, 5 wt. % Ba, and 5 wt. % Co.

Catalyst 1B (Pd—Ba/$CoAl_2O_4$):

Catalyst 1B is prepared according to the procedure of Catalyst 1A with the exception that the calcination used after cobalt nitrate addition is performed at 1000° C. for 4 hours to obtain $CoAl_2O_4$. Catalyst 1B contains 1 wt. % Pd, 5 wt. % Ba, and 5 wt. % Co.

Comparative Catalyst 1C (Pd—Ba/Alumina Support):

Comparative Catalyst 1C is prepared according to the procedure of Catalyst 1A with the exception that a stabilized alumina support is used and no cobalt is added to this catalyst. Comparative Catalyst 1C contains 1 wt. % Pd and 5 wt. % Ba.

Comparative Catalyst 1D (Pd/$CoAl_2O_4$):

Comparative Catalyst 1D is prepared according to the procedure of Catalyst 1B with the exception that a higher Co content is used and no barium is added to this catalyst. Comparative Catalyst 1D contains 1 wt. % Pd and 20 wt. % Co.

Following their preparation, all the catalysts are submitted to a redox aging. This aging consists in perturbing between rich and lean conditions every 5 min at 950° C. for a period of 16 hours. The gas composition during the redox ageing is shown in Table 1.

Example 2: Light-Off Testing Procedures

Catalysts 1A-1D are tested under a continuous gas mix with a typical TWC gas composition. The samples are tested from 110 to 500° C. using a ramp rate of 10° C./min. The total flow used is 5 L/min for 0.2 g of catalyst mixed with 0.2 g of cordierite, which was placed in a fix bed reactor. The gases used and their concentrations can be found below (Table 2).

The results show that the catalysts of the invention (Catalyst 1A and Catalyst 1B) have improved light-off performance compared to Comparative Catalysts 1C and 1D. Catalyst 1B shows improved light off compared to Catalyst 1A showing that pre-formation of the $CoAl_2O_4$ spinel prior to Pd and Ba addition is preferred to impregnation only.

TABLE 1

| Gas composition for the redox aging | | |
|---|---|---|
| Gas | Rich | Lean |
| $N_2$ | balance | balance |
| $C_3H_6$ | 1000 ppm | 1000 ppm |
| CO | 0.5% | 0.5% |
| NO | 1000 ppm | 1000 ppm |
| $O_2$ | 0.27% | 1.07% |
| $H_2O$ | 10% | 10% |

TABLE 2

| Gas mix composition for the light-off experiments | |
|---|---|
| Gas | λ Rich = 0.95 |
| $N_2$ | balance |
| $C_3H_8$ | 333 ppm |
| $C_3H_6$ | 666 ppm |
| CO | 2.3% |
| $CO_2$ | 14% |
| NO | 2200 ppm |
| $O_2$ | 0.9% |
| $H_2O$ | 5% |
| $H_2$ | 0.6% |

I claim:

1. A three-way catalyst composition comprising rhodium, a ceria-containing oxide, and a supported palladium component, wherein the supported palladium component comprises palladium, barium, and cobalt and alumina.

2. The three-way catalyst composition of claim 1 wherein the supported palladium component comprises palladium, barium and a cobalt aluminate spinel.

3. The three-way catalyst composition of claim 1 wherein the rhodium is supported on an inorganic oxide carrier.

4. The three-way catalyst composition of claim 3 wherein the inorganic oxide carrier is selected from the group consisting of alumina, silica, titania, zirconia, ceria, niobia, tantalum oxides, molybdenum oxides, tungsten oxides, and mixed oxides or composite oxides thereof.

5. The three-way catalyst composition of claim 1 wherein the ceria-containing oxide is selected from the group consisting of cerium oxide, a ceria-zirconia mixed oxide, and an alumina-ceria-zirconia mixed oxide.

6. The three-way catalyst composition of claim 1 wherein the supported palladium component comprises 0.1 to 1 weight percent palladium.

7. The three-way catalyst composition of claim 1 wherein the supported palladium component comprises 1 to 10 weight percent barium.

8. The three-way catalyst composition of claim 1 wherein the supported palladium component comprises 0.5 to 20 weight percent cobalt.

9. A three-way catalyst article comprising the three-way catalyst composition of claim 1 supported on a metal or ceramic substrate.

10. The three-way catalyst article of claim 9 wherein the substrate is a flow-through monolith.

11. The three-way catalyst article of claim 9 comprises a substrate and at least one layer on the substrate, wherein the at least one layer comprises the three-way catalyst composition.

12. The three-way catalyst article of claim 9 having two layers disposed on the substrate, wherein a first layer comprises the supported palladium component and a second layer comprises rhodium and the ceria-containing oxide.

13. The three-way catalyst article of claim 12, wherein the first layer is disposed on the substrate and the second layer is deposited on the first layer.

14. A method for treating an exhaust gas from an internal combustion engine comprising contacting the exhaust gas with the three-way catalyst article of claim 9.

* * * * *